United States Patent
Howell et al.

(10) Patent No.: US 7,575,244 B2
(45) Date of Patent: Aug. 18, 2009

(54) STRUCTURAL I-BEAM AUTOMOTIVE SUSPENSION ARM

(75) Inventors: Robert Alexander Howell, Brooklin (CA); Rudolf Gruber, Uxbridge (CA)

(73) Assignee: Multimatic, Inc., Markham, ON (CA)

( * ) Notice: Subject to any disclaimer, the term of this patent is extended or adjusted under 35 U.S.C. 154(b) by 93 days.

(21) Appl. No.: 10/510,177

(22) PCT Filed: Jan. 15, 2004

(86) PCT No.: PCT/CA2004/000055

§ 371 (c)(1),
(2), (4) Date: Oct. 4, 2004

(87) PCT Pub. No.: WO2004/065146

PCT Pub. Date: Aug. 5, 2004

(65) Prior Publication Data

US 2005/0104315 A1 May 19, 2005

(30) Foreign Application Priority Data

Jan. 20, 2003 (CA) .................................. 2416703

(51) Int. Cl.
*B60G 7/00* (2006.01)
(52) U.S. Cl. .................................. 280/124.134; 29/897.2
(58) Field of Classification Search .......... 280/124.134, 280/124.135, 124.136, 124.14, 124.143; 29/897.2
See application file for complete search history.

(56) References Cited

U.S. PATENT DOCUMENTS

| | | | | |
|---|---|---|---|---|
| 1,380,659 | A * | 6/1921 | Layman ..................... | 74/559 |
| 4,192,396 | A * | 3/1980 | Austermann et al. ........ | 180/252 |
| 4,798,397 | A * | 1/1989 | Komiya ................ | 280/124.152 |
| 5,607,177 | A * | 3/1997 | Kato ..................... | 280/124.134 |
| 5,695,213 | A * | 12/1997 | Nakamura et al. .... | 280/124.134 |
| 5,992,867 | A * | 11/1999 | Kato et al. ............ | 280/124.134 |
| 6,098,287 | A * | 8/2000 | Takahashi et al. ....... | 29/898.043 |
| 6,241,267 | B1 | 6/2001 | Dziadosz et al. | |
| 6,789,811 | B2 * | 9/2004 | Huber et al. ........... | 280/124.133 |
| 2002/0005621 | A1 * | 1/2002 | Christophliemke et al. ...... | 280/124.134 |
| 2004/0075234 | A1 * | 4/2004 | Seksaria et al. ........ | 280/124.134 |

FOREIGN PATENT DOCUMENTS

EP         0733499         9/1996

(Continued)

*Primary Examiner*—Eric Culbreth
(74) *Attorney, Agent, or Firm*—Arlir M. Amado; Kramer & Amado, P.C.

(57) ABSTRACT

A vehicular suspension arm, comprises an upper sheet metal stamped component with a first outer face and a first inner face, and a first central web portion with two opposites sides and first upstanding flange portions at opposites sides of the first web portion; a lower sheet metal stamped component with a second outer face and a second inner face, and a second central web portion with two opposite sides and second upstanding flange portions at the opposite sides of the second web portion. The first and second inner faces are adapted to contact each other along a substantial portion of the first and second web portions. The upper and lower stamped components adapted to be rigidly attached to each other to create a structural I-beam section. The thickness of each upstanding flange portion is at least equal to the combined thickness of the first and second web portions.

14 Claims, 5 Drawing Sheets

FOREIGN PATENT DOCUMENTS

| | | |
|---|---|---|
| EP | 1223058 | 7/2002 |
| EP | 1346855 | 9/2003 |
| JP | 08188022 | 11/1996 |
| JP | 09-123722 | 5/1997 |
| JP | 2002-192261 | 10/2002 |

* cited by examiner

STRUCTURAL I-BEAM AUTOMOTIVE SUSPENSION ARM

FIELD OF THE INVENTION

This invention applies to a manufacturing process for automotive suspension components, more particularly to those components requiring high stiffness to weight and strength to weight ratios. In particular, the invention applies to an automotive suspension arm.

DESCRIPTION OF THE PRIOR ART

Most modern road vehicles utilize some form of suspension system to isolate the passenger compartment from wheel disturbances caused by irregularities in the road surface. These suspension systems normally include some form of energy storage medium such as a spring, a device to control the spring's motion such as a damper, and a linkage arrangement to control the kinematics of the wheel movement. This combination of components is configured to allow the vehicle's wheels to move up and over road irregularities in a controlled manner. The most common form of linkage arrangement is a four-bar linkage configuration, constructed from the spindle assembly, the vehicle body, and two pivoting structural elements commonly referred to as control arms.

FIG. 1 illustrates a common prior art four-bar link configuration. The control arms (1)(2) locate and guide the movement of the spindle assembly (3), relative to the vehicle body (4). The spindle assembly carries the wheel, tire, bearing assembly and brake assembly which are collectively referred to as the unsprung mass (5) of the vehicle. The unsprung mass also includes a portion of the control arm weight. Because there is significant energy involved in moving the unsprung mass over road surface disturbances, it is preferable to reduce the combined weight of this subassembly as much as possible. Additionally, because the handling characteristics of the vehicle are directly dependent on the controlled movement of the unsprung components, it is imperative that the control arms have sufficient stiffness and strength to resist the substantial loadings that are imparted upon them.

It is therefore important that suspension control arms be strong and stiff to function well when loaded, as well as light in weight to reduce the unsprung mass. Reducing weight normally results in a reduction of both strength and stiffness. Great ingenuity is required to design parts with reduced weight but equivalent structural performance characteristics. The operational loads imparted on suspension control arms are discrete and well understood so that non-uniform structures can be developed to provide selective stiffness and strength in the directions and locations required by the application. Vehicle suspension control arms are generally configured in either an "A" or an "L" shape in plan view, depending on the configuration of the body mount to spindle relationship. In either case, the dominant induced loads are in the plane of the "A" or "L" formation and therefore require high in-plane stiffness. The most effective shapes for resisting these induced loads require a high concentration of material to be located around the edges of the "A" or "L" formation to maximize the in-plane second moment of area values. FIG. 2 illustrates a common prior art "L" shaped suspension control arm (8) with a high concentration of material around the edges of the structure facilitated by a casting manufacturing process. This structure is consistent with common structural section practice where I-beams are considered the most effective method of carrying bending loads. An I-beam configuration concentrates material at the extremities of the section away from the centroid, or neutral-axis. FIG. 2A is a cross-sectional view of a typical prior art I-beam, namely the cast "L" shaped suspension control arm of FIG. 2. The opposing extremities of an I-beam are referred to as the flanges (6) while the single centre component is referred to as the web (7). It is beneficial to have flanges which are as least as thick as the web to fully realize the structural advantages of an I-beam.

The requirement for optimized control arm structures to be non-uniform in shape has driven the use of a number of complex manufacturing processes. The most common manufacturing methods associated with vehicle control arm construction are casting, forging and the welding of press-formed metal stampings into subassemblies. Because of the complex shapes involved it is nearly impossible to manufacture an optimized vehicle control arm from simple press formed metal stampings.

The majority of suspension control arms that utilize press formed metal stampings in their construction are configured as closed box sections. FIG. 3 illustrates the section of a typical suspension control arm constructed from two U-shaped press-formed metal stampings. This type of structural section is far less efficient in resisting bending loads than an I-beam and requires a significant overlap of material to facilitate the required weld fillet joint. This material overlap is ultimately structurally redundant and results in a heavier solution than alternative cast or forged configurations.

U.S. Pat. No. 5,662,348 issued to Kusama et al discloses a suspension arm manufactured from press-formed parts. Kusama claims a wide range of different sectional configurations all aimed at stiffening a vehicle suspension control arm in a manner that is compatible with the induced loads. However, Kusama does not teach a method for creating a true I-beam section using press-forming techniques.

The use of I-beam sections is known in suspension arm technology and normally involves manufacturing using casting or forging techniques as illustrated in FIGS. 2 and 2A. However, it has also been common practice to utilize two cup-shaped press formed stampings, arranged back-to-back and projection welded together to create an I-beam section with the required plan view shape. Although I-beam sections have been created by combining two relatively simple stampings in this way, the flanges have been half the thickness of the web, which has resulted in poor structural performance. FIG. 4 illustrates a cross-sectional view of a typical prior art I-beam suspension control arm constructed from two cup-shaped press-formed stampings. It is important to note that the prior art manufacturing process dictates that the flanges are of a single material thickness while the web is of double material thickness. This is not an optimal structural configuration.

SUMMARY OF THE INVENTION

Accordingly, it would be advantageous to create a suspension control arm that could provide high inherent stiffness and strength while maintaining relatively low mass using a low cost manufacturing technique such as sheet metal press-forming. It has been proven that for large volume applications such as those dictated by the automotive industry, sheet metal press-forming is the most cost-effective method of manufacturing structural components. Almost every vehicle currently produced utilizes a body structure and selected subframes constructed almost entirely from either aluminum or steel stampings manufactured using press-forming techniques.

The aim of the present invention, therefore, is to utilize metal press-forming in the manufacture of a vehicle suspension control arm.

In an embodiment of the invention, a vehicle suspension control arm is constructed by welding two complex press-formed stampings together to form a highly efficient I-beam cross-section. Each stamping is configured with the correct plan view shape, namely an "A", "L", or other appropriate shape for the application, and is formed into a cup-shape section with the upstanding flanges fully returned back upon themselves to effectively double their thickness. The two stampings are then placed together in a back-to-back arrangement and welded along the free, peripheral edges. A key aspect of the configuration is that the trim edges of the folded over upstanding flanges leave an adequate gap to facilitate a high quality, four material weld. In other words, the welds join both the two web portions and the two flange portions along each peripheral edge of the part. The final assembly possesses a favorable structural I-beam section since the flanges and web have essentially the same thickness.

Accordingly, a vehicular suspension arm comprises: an upper sheet metal stamped component with a first outer face and a first inner face, and comprising a first central web portion and first upstanding flange portions at opposite sides of said first web portion; a lower sheet metal stamped component with a second outer face and a second inner face, and comprising a second central web portion and second upstanding flange portions at opposite sides of said second web portion; said first and second inner faces adapted to contact each other along a substantial portion of said first and second web portions; said upper and lower stamped components adapted to be rigidly attached to each other to create a structural I-beam section, wherein the thickness of each upstanding flange portion is at least equal to the combined thickness of the first and second web portions.

In further aspects of the invention:
a) the upper and lower stamped components are press-formed from sheet metal of uniform thickness; and each upstanding flange portion comprises a fully returned segment of said sheet metal, whereby the thickness of each upstanding flange portion is at least double the thickness of each web portion;
b) the upper stamped component and lower stamped component are press-formed from sheet aluminum, sheet steel, or similar sheet metal materials;
c) the upper stamped component and lower stamped component are rigidly attached to each other in a back-to-back configuration using welding, bolting, riveting, adhesive bonding, or similar fastening means;
d) the upper stamped component and lower stamped component are configured when placed into contact along said first and second inner faces to create a gap along a peripheral, joining edge suitable for facilitating a high quality welded joint which combines both butt and fillet configurations to join four material surfaces of the upper and lower components, and said upper and lower components are rigidly attached to each other by means of said welded joint;
e) the upper stamped component and lower stamped component are rigidly attached to each other along said first and second inner faces in a back-to-back configuration using projection welding across the respective first and second web portions;
f) the upper stamped component is configured with a first extruded opening at a predetermined point in the first web portion, and the lower stamped component is similarly configured with a second extruded opening in the second web portion, so that the first and second extruded openings align when the upper and lower stamped components are rigidly attached to each other to create a suitable structure to accept a ball joint of a spindle assembly;
g) at least one discontinuity is introduced in the fully returned flanges to create a suitable structure to accept vehicle body attachment details.

BRIEF DESCRIPTION OF THE DRAWINGS

FIG. 2A is a sectional view of the typical prior art suspension control arm of FIG. 2;

DETAILED DESCRIPTION OF THE INVENTION

Figure 1:
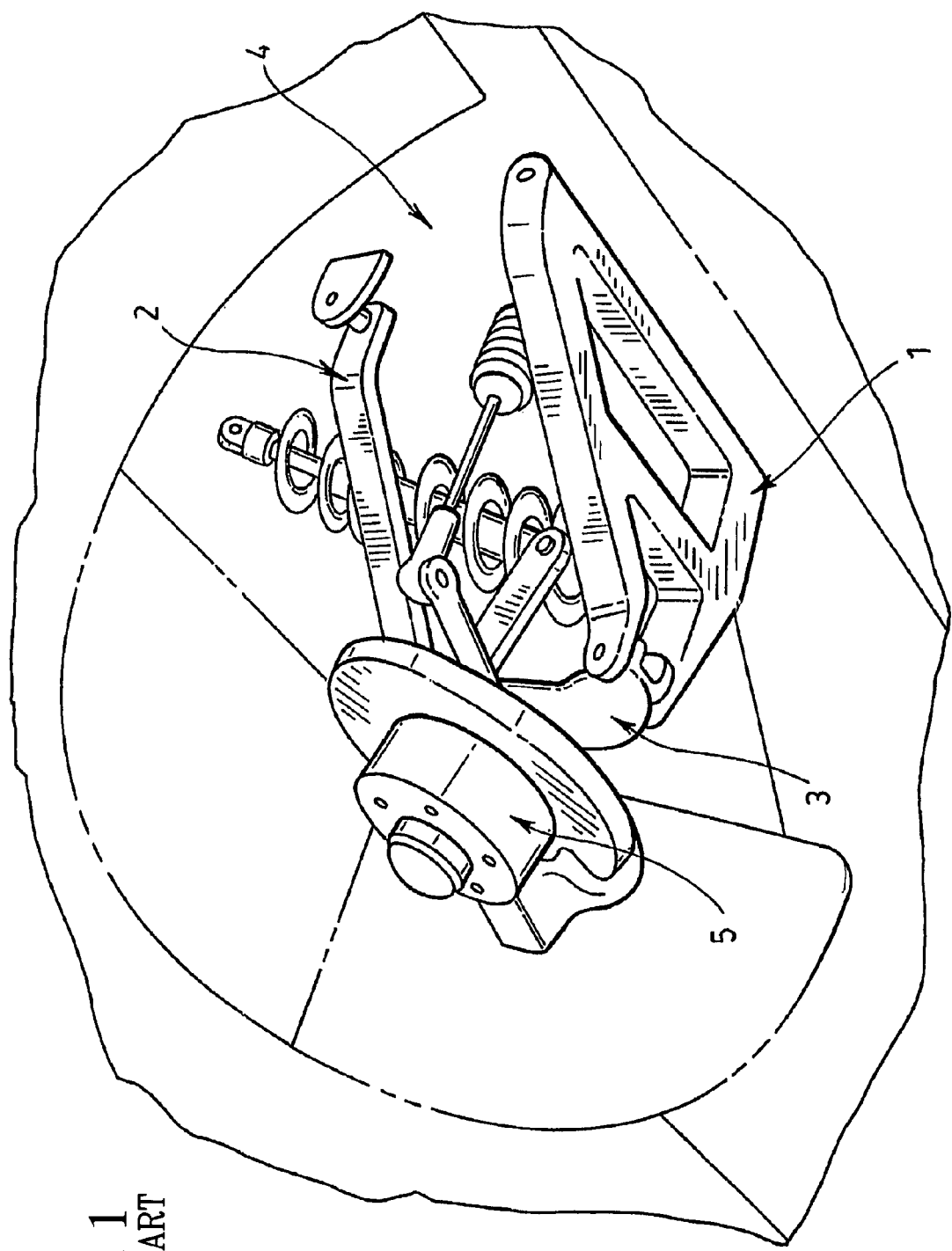
FIG. 1 is a perspective view of a common four bar link vehicle suspension system.
Figure 2:
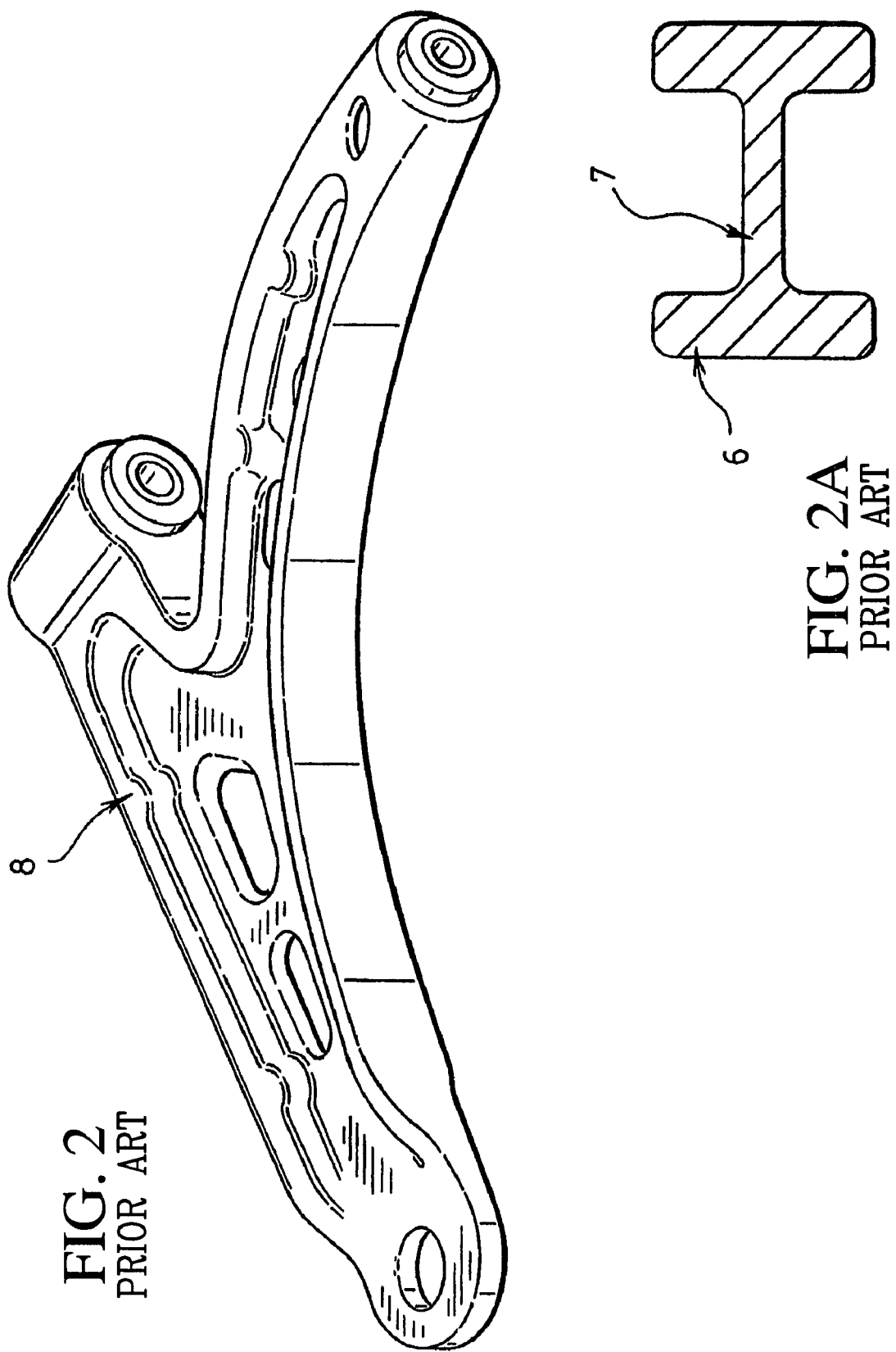
FIG. 2 is a perspective view of a typical cast prior art suspension control arm.
Figure 3:
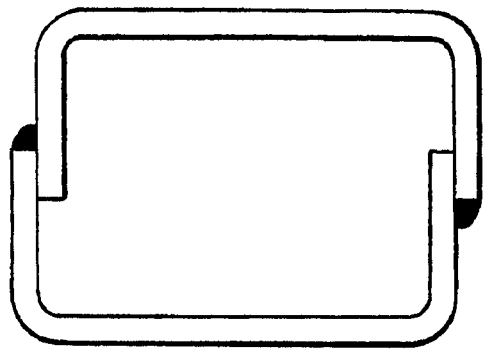
FIG. 3 is a sectional view of a typical stamped prior art suspension control arm.

Referring to FIGS. 5, 6, 7, 7A and 8, a vehicular suspension control arm (10) is substantially constructed from an upper stamped component (11) and a lower stamped component (12). Both the upper and lower stamped components are manufactured by press-forming a flat sheet of steel aluminum or other suitable metal or alloy into a required plan view shape which is dictated by the vehicle's suspension geometry requirements. Additionally, both the upper and lower stamped components are configured, during the press-forming process, with a cup-shaped section containing upstanding flanges (13) in which the material is filly returned back upon itself to effectively double the section thickness in this area. These fully returned flanges (13), of double material thickness run around the entire periphery of the stamped components with the exception of localized areas requiring special formations to facilitate the vehicle body attachments (14)(15) and the spindle attachment (20).

Figure 4:
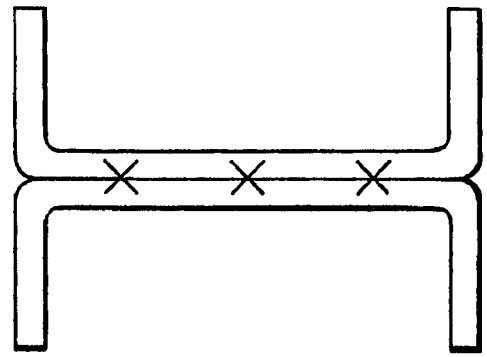
FIG. 4 is a sectional view of a typical stamped, I-beam section prior art suspension control arm

The final suspension control arm structure (10) is completed by rigidly, attaching the upper stamped component (11) and lower stamped component (12) in a back-to-back configuration using bolting, welding, adhesive bonding, riveting or similar fastening means. A typical section that results from the back-to-back attachment of the two stamped components is illustrated in the cross-sectional view of FIG. 7. In this manner, a highly effective I-beam section is created with the filly returned flange (13) thickness (T1) and web (17) thickness (T2) being identical and therefore structurally superior to the prior art section illustrated in FIG. 4.

Figure 5:
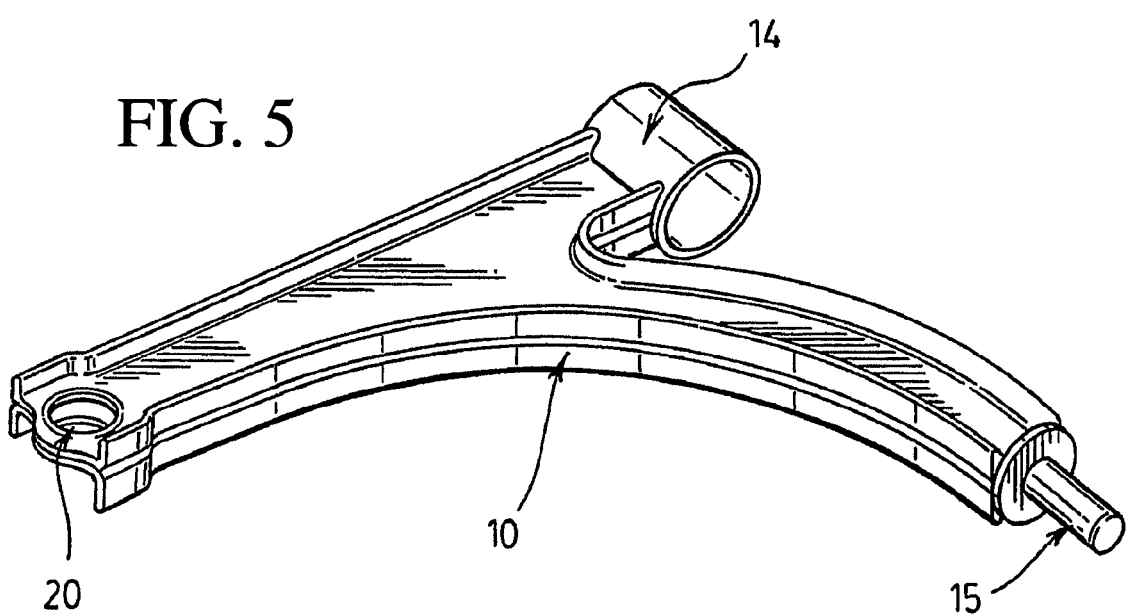
FIG. 5 is a perspective view of the inventive suspension control arm.
Figure 6:
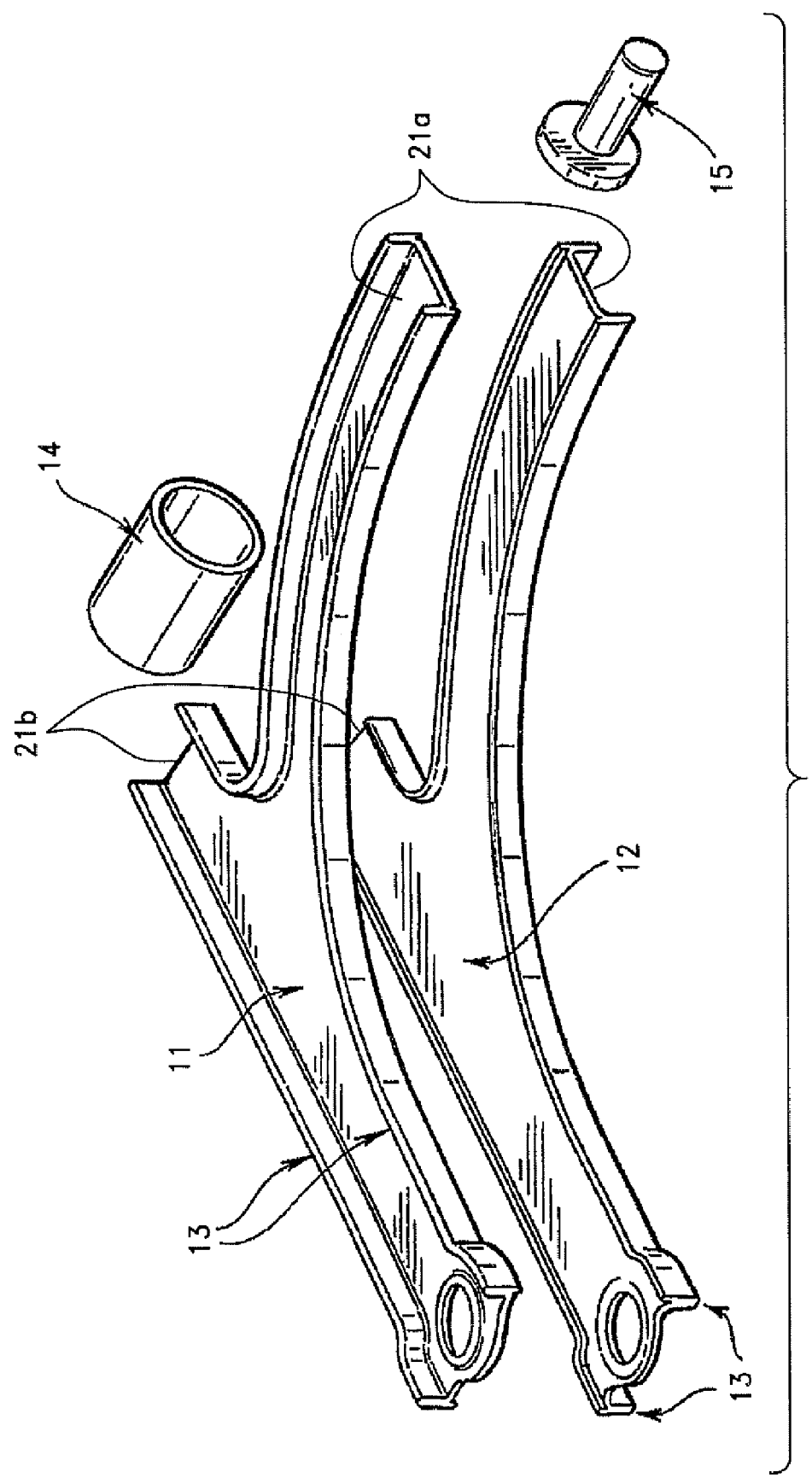
FIG. 6 is an exploded perspective view of the inventive suspension control arm.
Figure 7:
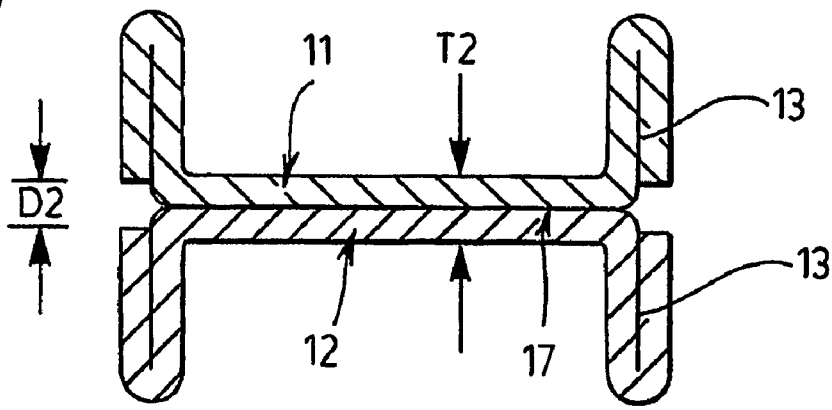
FIG. 7 is a typical sectional view of the inventive suspension control arm.
Figure 7A:
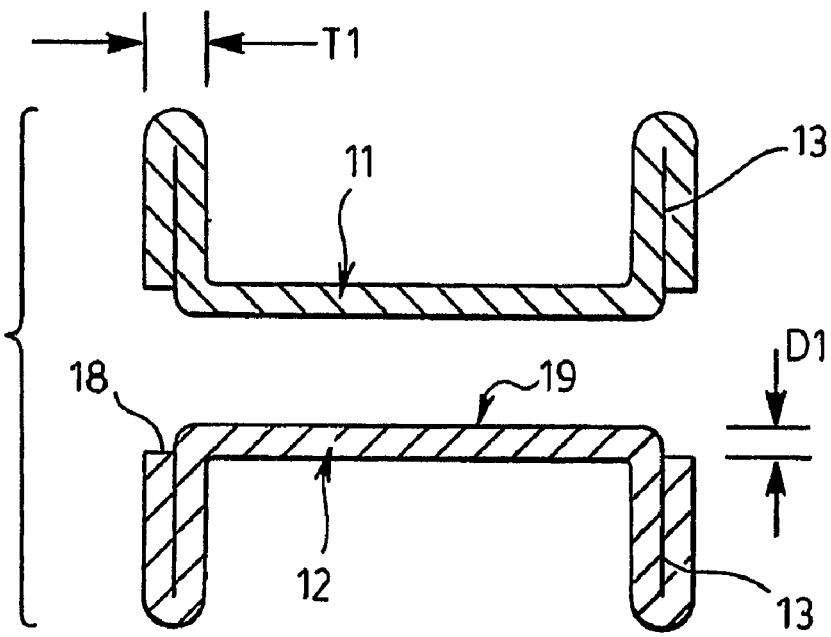
FIG. 7A is an exploded typical sectional view of the inventive suspension control arm.
Figure 8:
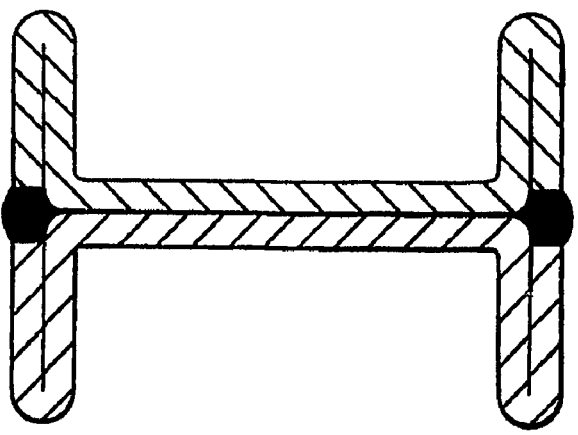
FIG. 8 is a typical sectional view of a preferred embodiment of the inventive suspension control arm including details of the welded joint.

In a preferred embodiment of the present invention, the fully returned flanges (13) of the upper stamped component (11) and lower stamped component (12) are configured with a trim edge (18) that is set at a predetermined distance (D1) from the interfacing surface (19) of the web (17). This distance (D1) then creates a gap (D2) between the trim edges of the upper stamped component (11) and the lower stamped component (12) suitable for facilitating a high quality, four material weld joint created by GMAW or similar welding means. On each edge of the assembled control arm, the opposing flanges and opposing webs are thus joined. FIG. 8 illustrates a cross-section of the preferred embodiment suspension control arm showing how an extremely rigid contiguous I-beam section is created by utilizing a four material weld joint around the periphery of the structure. The resulting weld joint is unique in that it is configured as a combination of a perpendicular fillet joint and a butt joint due to the four different material surfaces that it has to join. This weld can be continuous or discrete. Referring to FIGS. 5 and 6, the suspension control arm (10) is configured with a flanged hole (20) suitable for accepting the ball joint of the spindle assembly (3). This flanged hole (20) is created by punching and press-forming an extruded hole into both the upper stamped component (11) and lower stamped component (12) such that the extrusion direction is generally the same as that of the upstanding flanges (13) and the holes are dimensionally located in both of the stamped components (11)(12) so that they accurately align when the components are rigidly attached. As shown in FIG. 6. the suspension control arm (10) is also configured with at least one discontinuity (21a, 21b) in the upstanding flanges so that the vehicle body attachments (14)(15) can be facilitated. This discontinuity (21a, 21b) can be of complex shape adapted to accept a perpendicularly oriented, round bushing support (14) or a simple, straight cut-off adapted to accept an in-line pin (15).

Although, a preferred embodiment of the invention has been illustrated, it will be apparent to the skilled workman that variations or modifications of the illustrated structure may be made without departing from the spirit or scope of the invention.

The invention claimed is:

1. An element formed from sheet metal, comprising a vehicular suspension arm including:
   an upper sheet metal stamped component with a first outer face and a first inner face, and comprising a first central web portion with two opposite sides and first upstanding flange portions at said opposite sides of said first web portion;
   a lower sheet metal stamped component with a second outer face and a second inner face, and comprising a second central web portion with two opposite sides and second upstanding flange portions at said opposite sides of said second web portion;
   said first and second inner faces adapted to contact each other along a substantial portion of said first and second web portions;
   said upper and lower stamped components adapted to be rigidly attached to each other to create a structural I-beam section, wherein the thickness of each upstanding flange portion is at least equal to the combined thickness of the first and second web portions,
   wherein the upper stamped component and lower stamped component are configured when placed into contact along said first and second inner faces to create a gap along a peripheral, joining edge suitable for facilitating a welded joint which combines both butt and fillet configurations to join four material surfaces of the upper and lower components, and said upper and lower components are rigidly attached to each other by means of said welded joint.

2. The element formed from sheet metal of claim 1, wherein the upper and lower stamped components are press-formed from sheet metal of uniform thickness, and each upstanding flange portion comprises a fully returned segment of said sheet metal, whereby the thickness of each upstanding flange portion is at least double the thickness of each web portion.

3. The element formed from sheet metal of claim 2, wherein the upper stamped component and lower stamped component are press-formed from sheet aluminum or sheet steel.

4. The element formed from sheet metal of claim 3, wherein the upper stamped component is configured with a first extruded opening at a predetermined point in the first web portion, and the lower stamped component is similarly configured with a second extruded opening in the second web portion, so that the first and second extruded openings align when the upper and lower stamped components are rigidly attached to each other to create a suitable structure to accept a ball joint of a spindle assembly.

5. The element formed from sheet metal of claim 3, wherein at least one discontinuity is introduced in the fully returned segments to create a suitable structure to accept vehicle body attachment details.

6. The element formed from sheet metal of claim 2, wherein the upper stamped component is configured with a first extruded opening at a predetermined point in the first web portion, and the lower stamped component is similarly configured with a second extruded opening in the second web portion, so that the first and second extruded openings align when the upper and lower stamped components are rigidly attached to each other to create a suitable structure to accept a ball joint of a spindle assembly.

7. The element formed from sheet metal of claim 2, wherein at least one discontinuity is introduced in the fully returned segments to create a suitable structure to accept vehicle body attachment details.

8. The element formed from sheet metal of claim 1, wherein the upper stamped component and lower stamped component are press-formed from sheet aluminum or sheet steel.

9. The element formed from sheet metal of claim 8, wherein the upper stamped component is configured with a first extruded opening at a predetermined point in the first web portion, and the lower stamped component is similarly configured with a second extruded opening in the second web portion, so that the first and second extruded openings align when the upper and lower stamped components are rigidly attached to each other to create a suitable structure to accept a ball joint of a spindle assembly.

10. The element formed from sheet metal of claim 1, wherein the upper stamped component is configured with a first extruded opening at a predetermined point in the first web portion, and the lower stamped component is similarly configured with a second extruded opening in the second web portion, so that the first and second extruded openings align when the upper and lower stamped components are rigidly attached to each other to create a suitable structure to accept a ball joint of a spindle assembly.

11. A suspension system, comprising at least one vehicular suspension arm including:
   an upper sheet metal stamped component with a first outer face and a first inner face, and comprising a first central web portion with two opposite sides and first upstanding flange portions at said opposite sides of said first web portion;
   a lower sheet metal stamped component with a second outer face and a second inner face, and comprising a second central web portion with two opposite sides and second upstanding flange portions at said opposite sides of said second web portion;

said first and second inner faces adapted to contact each other along a substantial portion of said first and second web portions;

wherein said upper and lower stamped components are rigidly attached to each other to create a structural I-beam section, wherein the thickness of each upstanding flange portion is at least equal to the combined thickness of the first and second web portions, wherein said upper and lower components are rigidly attached to each other by means of a welded joint which combines both butt and fillet configurations to join four material surfaces of the upper and lower components.

12. The suspension system of claim 11, wherein the upper stamped component is configured with a first extruded opening at a predetermined point in the first web portion, and the lower stamped component is similarly configured with a second extruded opening in the second web portion, so that the first and second extruded openings align when the upper and lower stamped components are rigidly attached to each other to create a suitable structure to accept a ball joint of a spindle assembly.

13. The suspension system of claim 11,
wherein the upper and lower stamped components are press-formed from sheet metal of uniform thickness, and each upstanding flange portion comprises a fully returned segment of said sheet metal, whereby the thickness of each upstanding flange portion is at least double the thickness of each web portion.

14. The suspension system of claim 13, wherein at least one discontinuity is introduced in the fully returned segments to create a suitable structure to accept vehicle body attachment details.

* * * * *